United States Patent [19]
Blackmer

[11] 3,789,143
[45] Jan. 29, 1974

[54] COMPANDER WITH CONTROL SIGNAL LOGARITHMICALLY RELATED TO THE INSTANTANEOUS RMS VALUE OF THE INPUT SIGNAL

[76] Inventor: David E. Blackmer, Bolton Rd., Harvard, Mass. 04151

[22] Filed: Mar. 29, 1971

[21] Appl. No.: 128,892

[52] U.S. Cl. .......................... 179/15.55 R, 179/1 VL
[51] Int. Cl. .......................... H04b 3/04
[58] Field of Search ............179/1 VL, 1 D, 15.5 R; 330/95, 110; 333/14, 17, 18, 28 T; 307/230

[56] References Cited

UNITED STATES PATENTS

| | | | |
|---|---|---|---|
| 3,254,304 | 5/1966 | Barret | 307/230 |
| 3,632,886 | 1/1972 | Scheiber | 179/1 G |
| 3,631,365 | 12/1971 | Dolby | 179/1 D |
| 3,466,572 | 9/1969 | Hanna | 179/1 VL |
| 3,397,285 | 8/1968 | Golonski | 179/1 VL |
| 3,479,525 | 11/1969 | Harford | 333/14 |
| 3,535,550 | 10/1970 | Kang | 333/14 |
| 3,518,578 | 6/1970 | Oppenheim | 333/14 |

*Primary Examiner*—Kathleen M. Claffy
*Assistant Examiner*—Jon Bradford Leaheey

[57] ABSTRACT

A compander system for audio signal processing, in which two 90° phase separated signals are generated from an input audio signal. Each phase separated signal is processed through a converter which provides an output signal logarithmically related to the instantaneous rms value of the corresponding phase separated signal. The output currents from both converters are proportional to the square of the input currents, hence are summed to yield a virtually ripple free output. This summed output is then scaled and applied to control the gain of a variable gain amplifier which either compresses or expands the original input audio signal according to the gain of the latter amplifier. Thus, the expansion or compression is a continuous linear process proportioned to the rms value of the input audio signal.

12 Claims, 7 Drawing Figures

INVENTOR.
DAVID E. BLACKMER
BY
Schiller & Pandiscio
ATTORNEYS

INVENTOR.
DAVID E. BLACKMER

BY Schiller & Pandiscio
ATTORNEYS

INVENTOR.
DAVID E. BLACKMER
BY
Schiller & Pandiscio
ATTORNEYS

COMPANDER WITH CONTROL SIGNAL LOGARITHMICALLY RELATED TO THE INSTANTANEOUS RMS VALUE OF THE INPUT SIGNAL

This invention relates to signal conditioning and more particularly to signal compression and expansion.

In many audio signal transmission media such as phonograph records, recording tapes and broadcasting, the signal-to-noise ratio is sufficiently limited to interfere with the enjoyment or comprehension of the signal by a listener.

It is known that in recording and playback systems, the tolerance for inadequate signal-to-noise ratio can appear improved by using the techniques of compression (i.e., reduction of the dynamic range of an audio signal). Typically, manual gain riding is used to increase volume in soft passages and decrease volume in loud passages. Limiting and compression are used to modify the dynamic range of the louder passages only.

One approach to reduce noise (or more accurately, to add ten or so decibles to the program dynamic range) splits the audio spectrum into four bands and in each, independently of the others, boosts low-level signal components during recording and provides complementary attenuation during playback. Whenever in any band the signal level is already high, compression and expansion are not used. In this latter system, precise matching of levels is necessary if tonal balance is to be recreated accurately. Another similar system changes only high frequency gain to accomplish this reduction. Lastly, a system is known in which the enitre dynamic range is compressed with uniform frequency response before recording, and upon playback, the entire range is again expanded with an exact complementary function.

If a signal such as music or speech is compressed by a factor of about two over its full dynamic range, it actually becomes more listenable than uncompressed program material to the casual listener in a moderate signal-to-noise ratio environment. This appears to occur because the noise masks the lower intensity sounds thereby creating the illusion of greater dynamic range. Also, continuous constant slope compression has a more pleasing effect than the same over-all dynamic compression obtained by gain riding or peak limiting. A serious listener may expand the program back to its original dynamics and gain in this case twice the decibel range which the transmission channel would have handled without such a system. Thus, for example, a 46 db radio transmission channel can be expanded to 92 db effective dynamic range.

A principal object of the present invention is to provide an improved system or compander which compresses the entire dynamic range prior to recording (or transmission) and expands the range with an exact complementary function upon playback.

Another object of the present invention is to provide such an improved compander in which gain control is derived proportional to the rms value of the audio signal. This is important for unobtrusive compression because the human ear hears loudness in proportion to rms energy. Sound sources differ markedly, in their ratio of average to rms to peak signal. Peak detectors will over-react to a trumpet and under-react to a flute. Averaging detectors do the opposite. In music, instrumental balance is severely disturbed by non-rms derived gain control signals. Also, phase shifts in the transmission channel have negligible effect on the rms value of a signal whereas they may radically change the peak value.

Yet another object of the present invention is to provide such an improved compander system employing detection means having a very low output ripple in a quasi steady-state interval. Low-frequency harmonic distortion added by the operation of a fast acting envelope detector on system gain is sharply reduce by such detection means and hence does not modulate gain with low-frequency signals. A recovery rate of 60 to 200 db/sec is required for unobtrusive compression and to ensure sufficiently rapid gain control to follow transients and to prevent intrusion of noise during periods of rapidly decreasing level. With conventional full wave detection this recovery rate causes 1 percent to 6 percent harmonic distortion and intermodulation with a 30 HZ signal. With the system of the present invention this distortion is typically 0.2 percent or less.

Yet another object of the present invention is to provide such a system having a gain control means exhibiting a linear relationship between control voltage and gain in decibels.

To achieve the foregoing and other objects, generally the invention comprises means for sensing an input signal amplitude on a ripple-free rms basis so that the output from the sensing means is linearly related to the input level in decibels. A control amplifier is provided to set a gain change sense for either compression or expansion and provides a control signal output related to the product of the output of the sensing means and a gain factor introduced by the amplifier. Lastly, there is provided a gain control module which amplifies or controls the gain of the input signal in proportion to the control signal provided by the control amplifier.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, references should be had to the following detailed description taken in connection with the accompanying drawings wherein.

Figure 1:
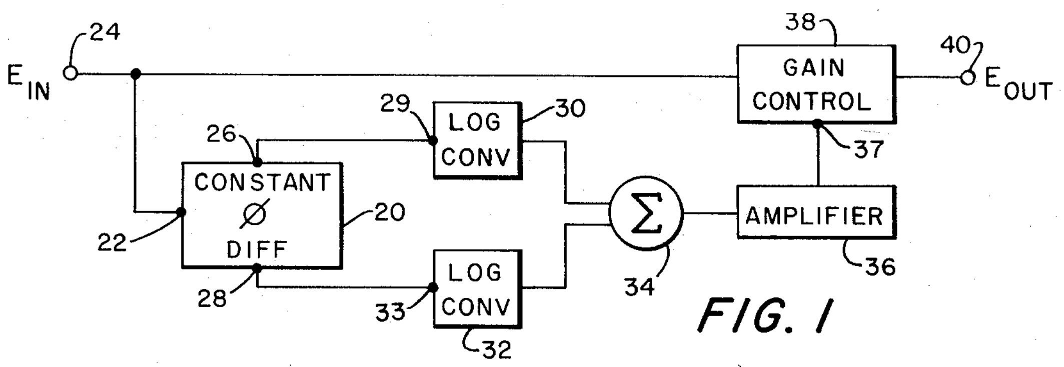
FIG. 1 is a block diagram of a compander circuit embodying the principles of the present invention.

In a typical embodiment of the present invention as shown in FIG. 1, means for sensing the input signal and producing an output which is logarithmically related to the instantaneous rms value of the input signal, comprises a constant phase difference or 90° phase network 20 having its input terminal 22 connected to the system input terminal 24 at which the input signal $E_i$ is intended to be applied. Network 20 has a pair of output terminals 26 and 28 at which the network is intended to provide corresponding output signals identical to one another except that they are electrically separated in phase by 90° at least in the low frequency region of 20 Hz to 200 Hz and are preferably linearly related to the input signal. Hence, the signals at terminals 26 and 28 can be considered to be sine and cosine related signals. Additionally, coupled to terminal 26 is input terminal 29 of a first circuit designated 30 for providing an output logarithmically related to the instantaneous rms value of the signal at terminal 26. A similar or second logarithmic circuit 32 has its input terminal 33 connected to terminal 28. Preferably, each of circuits 30 and 32 provide an output current which is proportional to the square of their input currents in any quasi steady-state interval of the input function. Hence, the current from the two circuits can be summed to meet the condition that $$\text{Sin}^2\theta + \cos^2 = 1 \quad \text{(1)B}$$

or will thus provide a substantially ripple-free output the average value of which is logarithmically related to $E_i$ when summed by summing means shown generally at 34.

The output of summing means 34 is connected to the input of amplifier circuit 36. The latter is preferably not only capable of amplification to provide the desired gain, but also includes logic circuitry adapted to set the sense of the amplification desired by the operator (i.e., either for expansion or compression).

The output of amplifier 36 is connected to control terminal 37 of gain control module 38. The latter has its input connected to system input terminal 24 and its output connected to system output terminal 40. A number of circuits are known that can control signal gain in response to a command or control signal. For example, one may use a light responsive resistance or a field effect transistor as an element in a voltage divider, or known analog multipliers using balanced semiconductor pairs or the like. In any case, module 38 serves to control the gain impressed on the signal $E_i$ in decibels in proportion to the control signal provided by amplifier 36 and thereby provides a compression or expansion in which the input to output levels, in decibels, are related be a substantially constant factor which is higher than unity in expansion ad lower than unity in compression.

Figure 2A:
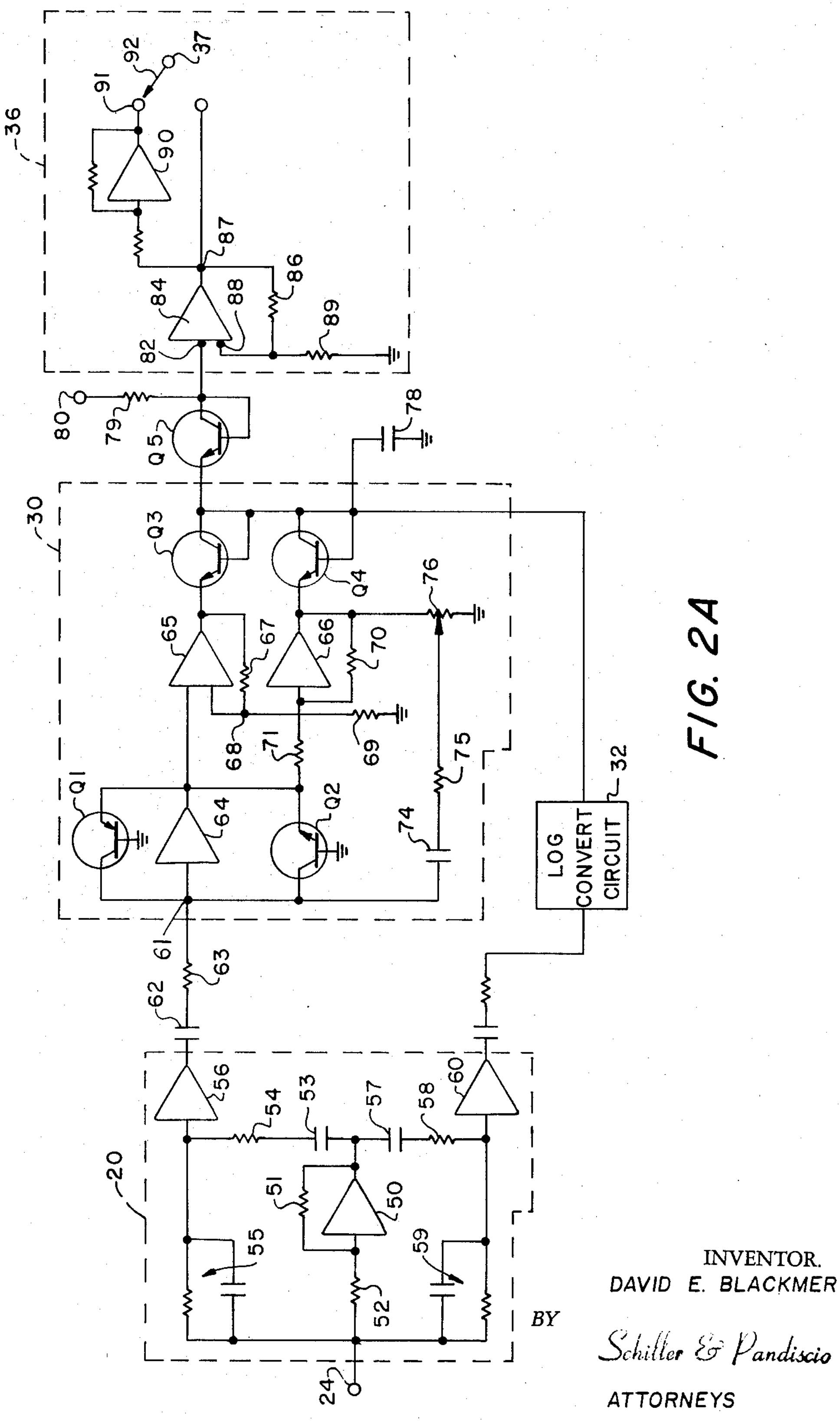
FIG. 2A is a circuit schematic showing details of a portion of the embodiment of FIG. 1.

A more detailed version of a preferred embodiment of the invention is shown in FIG. 2A wherein the means for providing a constant phase difference such as the 90° phase network 20 includes an operational amplifier formed of the usual very high-gain, inverting stage 50 with feedback resistor 51 between the output and input of stage 50, and input resistor 52 coupled to terminal 24. The output of stage 50 is connected through series connected capacitor 53 and resistor 54 to one side of RC tank 55 and to the input of unity gain follower 56. The other side of RC tank 55 is connected to terminal 24. Similarly, the output of stage 50 is connected through series connected capacitor 57 and resistor 58 to one side of RC tank 59 and to the input of unity gain follower 60. The other side of tank 59 is connected to terminal 24. Similar constant phase difference circuits and the operation thereof are well known and typically are discussed in *Proc. IEEE*, Vol. 58, No. 6, p, 593, June, 1970 and *IEEE Trans. Ckt. Theory*, Vol. CT 16, No. 2, p. 89, May, 1969.

The output of each of followers 56 and 60 are connected to respective bilateral logarithmic converters responsive to the rms value of its input signal, with a very wide range of response and a very high crest factor tolerance over the full dynamic range. While it will be appreciated that other log circuits may be useful in the present invention, the preferred schematic is shown in FIG. 2A in detail only in connection with circuit 30 (circuit 32 being substantially identical). Input terminal 61 of circuit 30 is connected to the output of follower 56 by coupling capacitor 62 and series resistor 63. The bilaterial converter comprises a high gain inverting amplification stage 64 having a pair of oppositely conductive feedback paths through matched semiconductor junctions, and exhibits the property that $$E_o \approx C + K \log I_i; \quad (2)$$

where Ehd o is the output voltage, $I_i$ is the input current, and $C$ and $K$ are substantially semiconductor device constants. This is true of both polarities for $I_i$.

Hence, one of the feedback paths is the collector-emitter circuit of pnp transistor $Q_1$ while the other feedback path is the collector-emitter circuit of npn transistor $Q_2$, the bases of both transistors being grounded. The emitters of transistors $Q_1$ and $Q_2$ are connected to the output ot of stage 64 and also the inputs of a pair of operational amplifiers 65 and 66. Amplifier 65 is a non-inverting configuration and has a feedback resistor 67 coupled to non-inverting input 68 of amplifier 65. Input 68 is also connected through resistor 69 to ground. Amplifier 66 has the usual feedback and input resistors 70 and 71 respectively coupled to the inverting amplifier input. Both amplifiers are adjusted so that for both polarities of an arbitrary d-c input voltage, the output voltages $E_o$ are identical. It will be apparent to those skilled in the art that by choosing appropriate resistor values, the amplifiers can provide $E_o$ as the input voltage $E_1$ multiplied respectively by the factors + 2 and − 2.

If the input current to the converter formed of transistors $Q_1$ and $Q_2$ and amplifier 64 is under 1 $\mu a$, the high frequency response of these transistors tends to be reduced. The falloff of frequency gain of transistors $Q_1$ and $Q_2$ is due to increased carrier diffusion time at the lower base-emitter voltage and also to collector-emitter capacitance.

The effect of the collector-emitter capacitance ($C_{CE}$) of the junctions in these transistors and the circuit stray capacitance is overcome or neutralized by introducing into the circuit of the present invention capacitor 74 and resistor 75 connected in series between input terminal 61 and the output of inverting operational amplilifier 66, preferably through potentiometer 76 which is adjusted to provide an optimum high frequency response. Resistor 75 should be selected or adjusted to provide an essentially capacitive current through capacitor 74 at all frequencies of interest, but also to limit the response beyond this frequency band and thus make feedback loop staabilization less difficult. This neutralization has been observed to increase the bandwidth, for example for an $I_{in}$ of 10 na, from less than 1 KHz to over 20 KHz.

Connected to the output of the amplifiers 65 and 66 are respective diodes or diode-connected npn transistors $Q_3$ and $Q_4$ having conduction characteristics through their collector-emitter circuit such that $$I = \log^{-1} (E - C/Kd) \quad (3)$$

where $I$ is the current being conducted, $E$ is the collector-emitter voltage, $Kd$ is inherently identical to the value of $K$ in equation (2) for either of transistors $Q_1$ or $Q_2$, and C is a circuit constant.

The basees of both transistors are, of course, connected to their respective collectors and the latter are tied together at summing junction 34. The corresponding output terminal of converter circuit 32 is also connected to summing junction 34. In turn, the latter is connected to one side of charge storage means such as capacitor 78, the other side of which is grounded.

As means for correcting at least part of the offset temperature coefficient effects of transistors $Q_1$ and $Q_2$, connected to summing junction 34 is the emitter of temperature compensating npn transistor $Q_5$, diode-connected base to collector.

As a substantially constant current supply, resistor 79 is connected between, on one hand, the coupled base and emitter of transistor $Q_5$ and, on the other hand, to power input terminal 80 at which a desired bias voltage is to be applied. As will be seen later, the constant current supplied thus to the collectors of transistors $Q_3$ and $Q_4$ (albeit through the collector-emitter circuit of transistor $Q_5$) in connection with capacitor 78 is very important in the present invention.

The collector of transistor $Q_5$ is connected to inverting input terminal 82 of potentiometric operational amplifier 84 which has its feedback resistor 86 connected between the amplifier output terminal 87 and noninverting input 88. The latter is also connected through resistor 89 to ground. Output terminal 87 is connected to the input of inverting operational amplifier 90. The output of amplifier 90 is connected to terminal 91. A switch 92 is provided which serves to connect either terminal 87 or 91 with terminal 37. Hence, by operation of switch 92, one may select either the negative or positive gain provided respectively by amplifier 90 and amplifier 84. Obviously, switch 93 and amplifiers 90 and 84 constitute an embodiment of amplifying means 36.

Figure 2B:
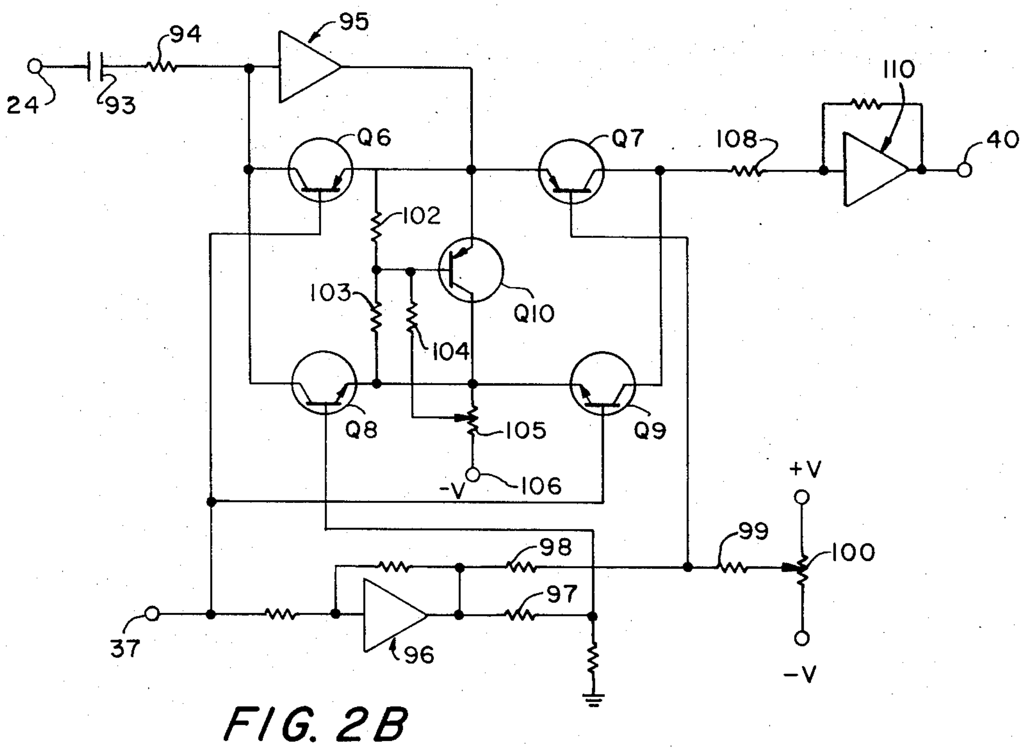
FIG. 2B is a circuit schematic showing the details of the remaining portion of the embodiment of FIG. 1.

The signals provided by amplifier means 36 are applied to terminal 37 of gain control module 38, an example of which is shown in FIG. 2B. The circuit shown in FIG. 2B provides excellent gain control over at least about a ± 50 decibel range with low distortions and noise, and a substantially constant decibels volt control characteristic. The gain control circuit includes a pair of pnp transistors $Q_6$ and $Q_7$ preferably matched for $V_{be}$ within 1 mV at 40 $\mu$a. A pair of npn transistors $Q_8$ and$Q_9$ are also provided, preferably similarly matched. All of these transistors are tightly thermally linked as by mounting closely adjacent one another on a common heat sink.

System input terminal 24 is also coupled through series-connected coupling capacitor 93 and resistor 94 to the input of operational amplifier 95 designed preferably to have a very low input bias current and voltage offset, nd also to the collectors of transistors $Q_6$ and $Q_8$. The emitters of transistors $Q_6$ and $Q_7$ are connected to one another and similarly, the emitters of transistors $Q_8$ and $Q_9$ are tied together. The bases of transistors $Q_6$ and $Q_9$ are tied together. The bases of transistors $Q_6$ and $Q_9$ are connected to control input terminal 37. Also connected to terminal 37 is an inverting operational amplifier 96, the output of which is connected through resistor 97 to the base of transistor $Q_8$ and through resistor 98 to the base of transistor $Q_7$. The base of transistor $Q_7$ is also connected through resistor 99 to adjustable potentiometer 100.

The emitters of transistors $Q_6$ and $Q_7$ are connected through a pair of resistors 102 and 103 to the connected emitters of transistors $Q_8$ and $Q_9$. The output of amplifier 95 is connected to the emitter of pnp transistor $Q_{10}$, the base of the latter being connected to the junction of resistors 102 and 103. The base of transistor $Q_{10}$ is also connected through resistor 104 to adjustable potentiometer 105. Potentiometer 105 is connected between the collector of transistor $Q_{10}$ and an input terminal 106 at which a negative voltage $-V$ can be applied. It will be apparent that when the collector-emitter circuit of transistor $Q_{10}$ is conductive, effectively transistor $Q_6$ and $Q_8$ constitute oppositely poled conductive feedback paths around amplifier 95. Lastly, the collectors of transistor $Q_7$ and $Q_9$ are connected through input resistor 108 to the input summing junction of operational amplifier 110. The output of the latter is connected to system output terminal 40.

In operation, an input signal $E_i$ applied to terminal 24 is duplicated by circuuit 30 to provide two output signals $E_{iA}$ and $E_{iB}$ identical to one another and to $E_i$ except that they are 90° phase displaced with respect to one another. Each of these output signals is fed through a respective buffering unity-gain follower 56 and 60 and the coupling capacitor and resistor to the input of respective circuits 30 and 32.

Figure 3:
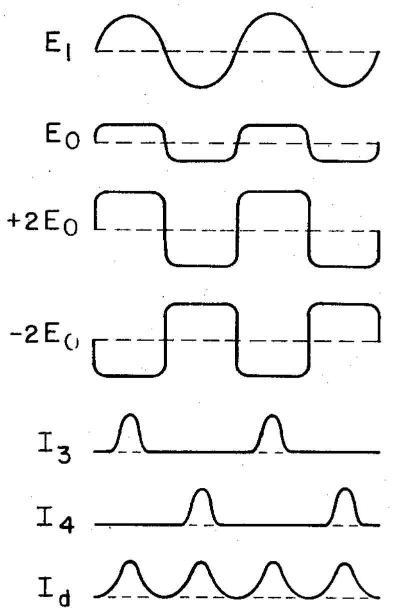
FIG. 3 is a group of exemplary idealized waveforms on a common time base explanatory of the operation of part of the compander of FIG. 1.

In circuit 30, signal $E_{iA}$ is converted by amplifier 64 and transistors $Q_1$ and $Q_2$ according to equation (2) to yield an output signal $E_{oA}$ which has a value logarithmically related to $E_{iA}$. Now, assuming that $E_{iA}$ is a steady-state sinusoid, the output signal $E_{oA}$ will appear as a log-sinusoid, all as shown in FIG. 3. Multiplication by a factor of two in opposite polarities respectively by amplifiers 65 and 66 provides $-2E_{oA}$ and $+2E_{oA}$ as shown in FIG. 3. These latter two signals are essentially phase displaced (by 180°) versions of one another. When each of these signals is fed through or anti-log rectified by a respective one of diode-connected transistors $Q_3$ and $Q_4$, the output current is instantaneously related to $I_i^2$. The output signals $I_3$ and $I_4$ from those transistors are, as shown in FIG. 3, half waves which each have an instantaneous value related respectively to $(E_{iA})^2$. When summed at junction 34, they yield a $\sin^2$ current waveform having an average current Id equal to half the current from resistor 79 (assuming that circuit 32 is balanced so as to employ one half the current from resistor 79).

It is important to note that signals $I_3$, $I_4$ and $I_d$ are all currents, and that the foregoing description of operation relates to a steady state or quasi-steady state of input signal $E_i$. In such case, the average output current $I_d$ from each of circuits 30 and 32 is substantially equal to one-half of the constant current $I_c$ being provided by resistor 79. Capacitor 78 will maintain the collector voltage of transistors $Q_3$ and $Q_4$, and thus the input voltage to amplifier 84 at a substantialally steady value $E_c$, for both circuits 30 and 32, assuming all transistors $Q_3$ and $Q_4$ of both circuits 30 and 32 are matched to track. Now, when $E_i$ changes from one steady-state (keeping in mind that a steady state ac is here intended to mean one which stays at a substantially fixed rms value) to another, the transient change causes $I_d$ to vary considerably from the value of $I_c$. This serves to swing the voltage on capacitor 78 in value and direction tending to create the desired steady-state equality between $I_c$ and the average value of $I_d$.

The value of $E_c$ is linearly related to the rms value of $E_i$ in decibels, because the instantaneous current in anti-log rectifier $Q_3$ and $Q_4$ is proportional to $E_i^2$. The capacitance of capacitor 78 and the magnitude of current $I_c$ determine the recovery rate for falling signals, i.e., how quickly $E_c$ will change to bring $I_d$ to the value of $I_c$ when $I_d >> I_c$. The response to rising signals will be a non-linear function related to $E_i^2$. For a small increment of input $E_i$, the response time constant is, due to the product of the diode impedances of transistors $Q_3$ and $Q_4$ times the capacitance of capacitor 78. For example, the initial rate of rise for a 20 db step increase in input $E_i$ will be about 100 times greater than for a 0.1 db increase. This variable time response appears to be a basic property of this circuit and will bear a fixed relationship to the rate limited fall-back rate for any such circuit. Thus, the fall-back rate specification is adequate to describe the relative time response characteristic of the circuit.

Circuit 30 as thus far described does not have full temperature correction for the temperature dependent offsets of transistor $Q_3$ and $Q_4$. It should be noted, for example, that for an input current of $\pm 1\ \mu a$ to transistor $Q_3$, $V_{be}$ will change about 2.7 mv/C°. A change in log slope of about ± 0.33%/C° may also be expected. Because of the gain provided by amplifiers 65 and 66, transistors $Q_3$ and $Q_4$ correct only half of the voltage temperature coefficient of transistors $Q_1$ and $Q_2$. Transistor $Q_5$ operates at constant current provided by the voltage source applied at terminal 80, hence does not affect the rms properties of the circuit but does correct the remaining offset temperature coefficient of transistors $Q_1$ and $Q_2$. The gain providd by amplifiers 84 and 90, of course, is set by the ratio of their associated resistors. If resistors having a temperature coefficient of gain equal to $1/T_k$ (where $T_k$ is the Kelvin temperature) are used, then the slope temperature coefficient can be fully corrected.

Because as noted the instantaneous value of $I_d$ is proportional to $E_i^2$, and the average value of $E_c$ is proportional to the logarithm of the rms value of $E_i$, the allowable crest factor is determined by the current range over which $$I_d = \log^{-1} (E-C)/Kd$$

and by the valuee of the constant current $I_c$ provided by resistor 79 and the available current from amplifiers 65 and 66. With values such as $I_c = 10^{-6}$ A, and $10^{-2}$A available from amplifiers 65 and 66, input voltage crest factors of 100 can be accommodated.

The input signal $E_{iB}$ is treated in a similar manner in rms circuit 32 and its output current is summed at junction 34 also. The two output currents, meeting the condition of equation (1), when summed therefore yield a virtually ripple free output.

The desired overall gain for compression or expansion is set by the gain provided by amplifier 36. The output signal from the latter is applied as the control signal to terminal 37 whence it is applied to the bases of transistors $Q_6$ and $Q_9$ directly, and in inverted form to the bases of transistors $Q_7$ and $Q_8$. Transistors $Q_6$ and $Q_8$ are connected as feedback paths around operational amplifier 95. The latter transistors being of opposite conductivity types, function as logarithmic converters respectively to convert the positive and negative portions of the input signal $E_i$ to amplifier 95 into logarithmic form. Transistors $Q_7$ and $Q_9$ serve as antilog converters which reconvert the signals from transistors $Q_6$ and $Q_8$ into linear currents.

The signal applied to the bases of transistors $Q_6$ and $Q_9$ and the inverted form of that signal applied to the bases of transistors $Q_7$ and $Q_8$ provides the gain control for the current flowing through the collector-emitter circuits of transistors $Q_6$, $Q_7$, $Q_8$ and $Q_9$. Alternatively, one can simply control the bases of only transistors $Q_6$ and $Q_9$, or the bases of only transistors $Q_7$ and $Q_8$ if extremes in gain (or attenuation) are not required. Resistors 102, 103, 104 and 105 permit the crossover region between polarities to be filled and are normally selected to provide a quiescent collector current in transistors $Q_6$, $Q_7$, $Q_8$ and $Q_9$ of from 0.1 to 1 $\mu a$. Specifically, resistors 102 and 103 multiply the temperature coefficient of $V_{be}$ of transistor $Q_{10}$ to cause the latter, connected collector-emitter across the emitters of transistors $Q_1$ and $Q_2$, to track the $V_{be}$ temperature coefficients of the latter transistors at their quiescent collector currents. The setting of potentiometer 105 and the value selected for resistor 104 allow the desired value of quiescent current to be set. Similarly the selection of resistor 99 and the setting of potentiometer 100 adjusts for transistor offsets, thereby permitting the gain for negative and positive input signals $E_i$ to be made identical.

With balanced transistors, the circuit gain will be unity with the control voltage $E_c$ at terminal 37 being zero. Typically, $E_c$ will have a control constant of −29.8 mv for + 20 db gain. This constant will have a temperature coefficient of + 0.33%/c° and is proportional to T absolute. A voltage divider having a ratio inversely proportional to T absolute may be used to feed $E_c$ if temperature invarient gain control is desired, or in this circuit use, this conpensation may be omitted from both the level sensing and the gain control means as both have the same temperature coefficient of slopes and hence are self-compensating if operated with tracking temperatures.

The frequency response of this circuit will be uniform up to well beyond 20 KHz with gains up + 50 decibels and losses to −50 db. Some slight change in frequency response occurs at greater gains. Equivalent input noise voltage with + 40 db gain and 20 KHz noise bandwidth will be about 3.4 microvolts rms which is less than 3 db over the noise due alone to an input resistor of about 22 KΩΩ. Peak input voltage may be in excess of 100 volts when gain is = 20 db, hence the input signal to noise ratio should be greater than 140 decibels. Output signal to noise ratio is lower but this presents no significant restriction on audio system performance as a gain control device may be expected by the nature of its use to have a lower output dynamic range requirement.

Alternatively, one can eliminate the bias circuit provided by resistors 102, 103, 104 and potentiometer 105 with other circuits which serve to provide appropriate crossover bias between $Q_6$ and $Q_8$ such as a diode string or a thermistor circuit.

In any case, the gain controlled signals appearing as currents at the collectors of transistors $Q_7$ and $Q_9$ are applied to output operational amplifier 110 and appears as the compressed or expanded signal, as the case se may be, at system output terminal 40.

Figure 4:
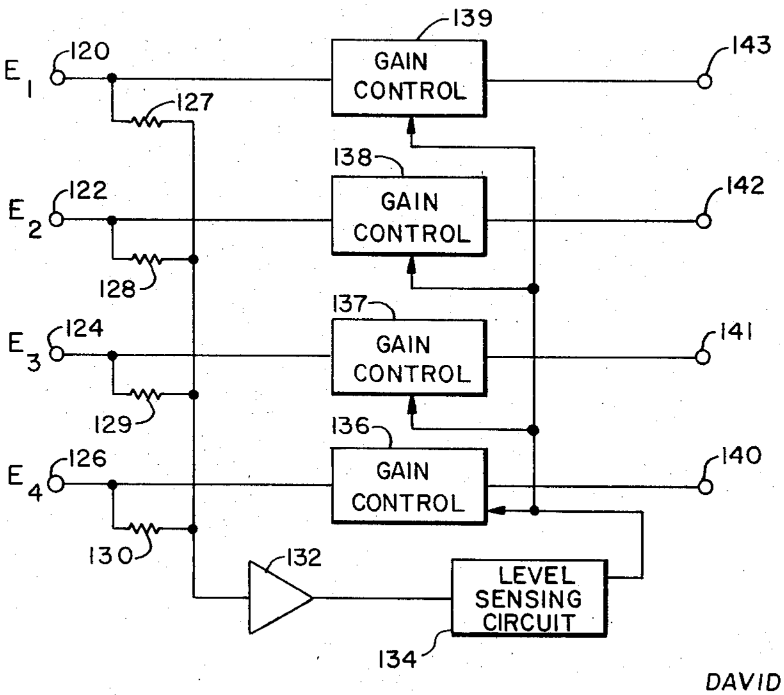
FIG. 4 is a diagram mostly in block form showing a four channel system using the principles of the present invention.

A stereo or quadraphonic system may be constructed with two or four of the systems shown in FIG. 1. Alternatively, as shown in FIG. 4, it may be accomplished with one level sensing circuit provided the balance of channel gains is carefully mainntained. In the system of FIG. 4 there are four input terminals 120, 122, 124 and 126 intended to accept four separate input signals. The latter, converted to currents in resistors 127, 128, 129 and 130 respectively connected to iinpuput terminals 120, 122, 124 and 126, are applied at input input of summing amplifier 132. A level sensing circuit 134 (substantially formed of difference circuit 20, a pair of rms log circuits 30 and 32 connected through summing junction 34 to amplifier 36 as previously described) is provided with its input connected to the output of amplifier 132 and its output connected to the respective control input terminals of four gain control modules 136, 137, 138 and 139, each typically being the circuit shown for example in FIG. 2B. The system input terminal of each gain control module is connected to a respective one of input terminals 127, 128, 129 and 130. The output terminals of gain control modules 136, 137, 138 and 139, at which the expanded or compressed signals appear, are shown respectively at 140, 141, 142 and 143.

Figure 5:
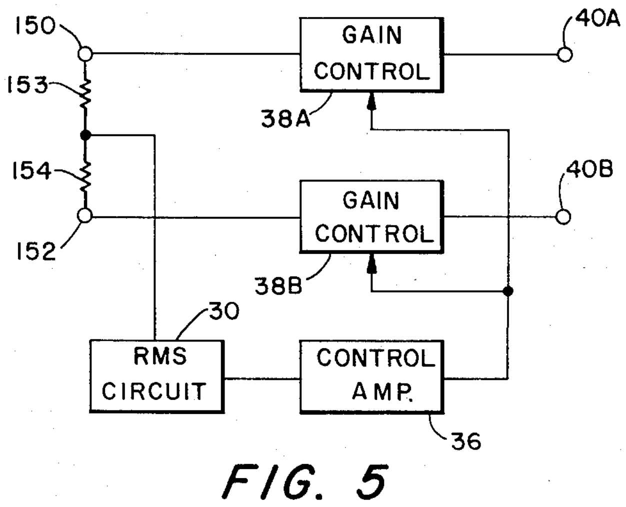
FIG. 5 is a block diagram of a simple two channel system of the present invention.

An economy version of a stereo system incorporating principles of the present invention is shown in FIG. 5 to like numerals denote like parts with respect o the previously described systems. It will be seen that a pair of input terminals 150 and 152 representing separate stereo channels are respectively connected to the system input terminals of gain control modules 38A and 38B, and also through a pair of resistors 153 and 154 to one another. The respective output terminals of modules 38A and 38B are shown as 40A and 40B. A single rms log circuit 30 is connected to the junction of resistors 153 and 154 and the output of circuit 30 is connected to the input of control amplifier 36. The output of the latter in turn is connected to the gain control terminals of modules 38A and 38B.

For the system of FIG. 5, the equivalent input signal fallback rate at the smoothing capacitor in circuit 30 is typically 60 db/sec and the compression and expansion factors are typically two, or 10 db of gain change for each 20 db of input dynamic range on compression and 10 db of gain change for each 10 db of input dynamic range on expansion. These rates will result in abobout 0.4% harmonic distortion at 60 hz and 1.2% at 20 Hz input signal.

Figure 6:
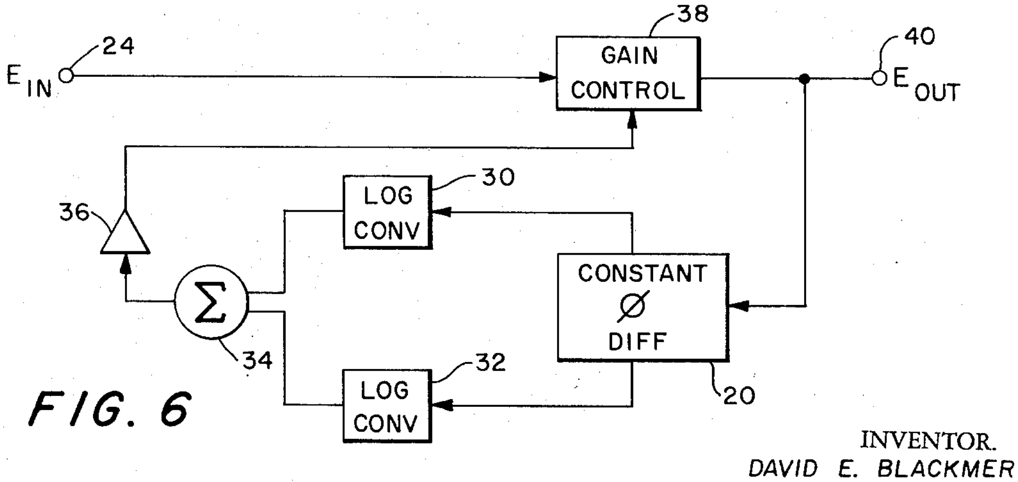
FIG. 6 is a block diagram of yet another version of a circuit embodying the principles of the present invention.

In FIG. 6, there will be seen yet another system, quite similar to that of FIG. 1. As shown, the system of FIG. 6 includes the same components as FIG. 1 wherein the output of constant phase difference circuit is connected to both circuits 30 and 32, the outputs of the latter being summed at 34 and amplified in amplifier 36. The output of the latter is connected to gain control module 38 in the same manner as in the embodiment of FIG. 1. However, it will be seen that the input to circuit 20 is from the output terminal 40 of module 38 rather than from input terminal 24 as in FIG. 1. Hence the system of FIG. 6 is a feedback system as distinguished from the feed-forward system of FIG. 1.

The system of FIG. 6, with proper gain and time constant set in amplifier 36 will compress over a tremendous dynamic range. For example, for an $E_{in}$ with a range of 1 $\mu$v to 10 v (the response extremes of a superior microphone) or a 140 db input range, the output typically can swing between 1 mv to 3 or 70 db.

The described compander systems may be operated with comparison and expansion factors up to three and beyond with essentially perfect tracking of dynamic transients. Furthermore, this tracking remains quite good even with rather extreme transmission system phase distortion as the RMS value of such a signal does not change in magnitude but suffers only a time displacement of high frequency components.

The major limitation imposed on compression factor is the magnification of gain anomalies such as dropouts in magnetic tape recording.

Since certain change may be made in the above apparatus without departing from the scope of the invention hererein involved, it is intended that all matter contained in the above description or shown in the accompanying drawings shall be interpreted as illustrative and not in a limiting sense.

What is claimed is:

1. A compression and expansion system for an input signal, comprising in combination means for sensing the amplitude of said input signal and for providing a variable DC control signal logarithmically related to the rms amplitude of said input signal, and means for amplifying said input signal by a gain variable responsively to said control signal.

2. A system as defined in claim 1 wherein said means for amplifying is such that, expressing the levels of said input and output signals in decibels, said output signal is linearly related to said input signal.

3. A system as defined in claim 1 wherein said control signal is related to the logarithm of the short term rms value of said input signal.

4. A system as defined in claim 1 wherein said input signal has a time-varying amplitude and said means for sensing comprises a circuit for generating responsively to said input signal, a pair of second signals identical to one another except for a substantially constant 90° phase difference, a pair of means responsive to each of said second signals for generating corresponding third signals which are proportional to substantially the respective squares of the difference between instantaneous and average values of said seconds signals, and means for summing said third signals.

5. A system as defined in claim 4 wherein said third signals are currents.

6. A system as defined in claim 5 including a constant current source, and charge storage means so connnected to said source and to said means for summing said third signals that the voltage of said charge storage means tends to change so as to bring the constant current from said source into substantial equality with the sum of said third signals.

7. A system as defined in claim 4 wherein each of said means for generating third signals comprises means for generating from said input signal $E_i$ an output signal in the form log $E_i$ for any polarity of $E_i$,
means for amplifying the signal in the form log $E_i$ by the factors +2 and −2 on separate channels, and
means for half-wave rectifying the signal on each of said channels so as to obtain substantially the antilogs thereof in the form of currents having instantaneous values related to the square of $E_i$.

8. A system as defined in claim 7 including means for summing the half-wave rectified currents from each of said channels to provide one of said third signals,
a constant current source, and
charged storage means so connected to said source and to said means for summing said third signals that the voltage of said charge storage means tends to change so as to bring the long-term average sum of said third signals into substantial equality with the constant current from said source, said voltage being said control signal.

9. A system as defined in claim 1 wherein said means for amplifying said input signal varies said gain in proportion to the product of said control signal and a substantially constant gain factor which is respectively negative or positive according as the system is intended to compress or expand the amplitude of the input signal.

10. Method of conditioning an input signal comprising the steps of
sensing said input signal and generating responsively thereto a variable DC control signal logarithmically related to the short-term rms value of said input signal,
amplifying said input signal by a gain proportional to the product of said control signal times a substantially constant, selected gain factor which is negative to obtain signal compression or positive to obtain signal expansion.

11. Method of conditioning an input signal as defined in claim 10 wherein said compression and expansion are substantially complementary in time response.

12. A compression and expansion system for a plurality of parallel input signals, comprising in combination
means for summing all of said input signals;
means for providing a control signal related to the logarithm of the amplitude of the rms summed signals;
means for amplifying each of said input signals by a gain variable responsively to the antilogarithm of said control signal.

* * * * *